(12) United States Patent
Gu et al.

(10) Patent No.: US 12,259,365 B2
(45) Date of Patent: Mar. 25, 2025

(54) METHODOLOGY AND INSTRUMENTATION FOR THIN FILM MECHANICAL ANALYSIS

(71) Applicant: The University of Southern Mississippi, Hattiesburg, MS (US)

(72) Inventors: Xiaodan Gu, Hattiesburg, MS (US); Dakota F. Ehlenberg, Baton Rouge, LA (US); Song Zhang, Hattiesburg, MS (US)

(73) Assignee: The University of Southern Mississippi, Hattiesburg, MS (US)

( * ) Notice: Subject to any disclaimer, the term of this patent is extended or adjusted under 35 U.S.C. 154(b) by 651 days.

(21) Appl. No.: 16/401,009

(22) Filed: May 1, 2019

(65) Prior Publication Data

US 2019/0339180 A1    Nov. 7, 2019

Related U.S. Application Data

(60) Provisional application No. 62/665,219, filed on May 1, 2018.

(51) Int. Cl.
*G01N 3/08*    (2006.01)
*G01B 13/24*    (2006.01)
*G01N 3/02*    (2006.01)

(52) U.S. Cl.
CPC ............... *G01N 3/08* (2013.01); *G01B 13/24* (2013.01); *G01N 3/02* (2013.01)

(58) Field of Classification Search
CPC ........ A61B 17/3421; A61B 2090/0454; A61B 90/04; A61B 90/05; A01M 7/0078; G01B 13/24; G01N 2203/0005; G01N 2203/0016; G01N 2203/0094; G01N 2203/0282; G01N 3/02; G01N 3/08
See application file for complete search history.

(56) References Cited

U.S. PATENT DOCUMENTS

| | | | | |
|---|---|---|---|---|
| 8,889,420 | B2 * | 11/2014 | Zang | B82Y 10/00 436/103 |
| 2013/0344679 | A1 * | 12/2013 | Lee | H01L 21/7806 438/458 |
| 2021/0178527 | A1 * | 6/2021 | Zhang | F28F 13/06 |

FOREIGN PATENT DOCUMENTS

| | | | | |
|---|---|---|---|---|
| JP | 2002221473 | A | * | 8/2002 |
| JP | 2003035640 | A | * | 2/2003 |
| KR | 20090115370 | A | * | 11/2009 |

* cited by examiner

*Primary Examiner* — Kristina M Deherrera
*Assistant Examiner* — Gedeon M Kidanu
(74) *Attorney, Agent, or Firm* — Butler Snow LLP

(57) ABSTRACT

The invention provides for a material characterization system, method, and instrumentation for measuring the mechanical properties of nano-scale thin films. The thin film mechanical characterization system, method, and instrumentation of the present invention for ultra-thin films includes a motor and load cell. The instrumentation device includes a bath that can be filled or used with liquid so that a thin film can float via the surface tension and can be stretched until permanent deformation occurs, while recording the amount of force applied by the motor and other parameters. Further, the invention provides a process that transfers the nano-scale thin film to the tensile testing instrument and a process to obtain the physical mechanical properties of thin films that are at the nanoscale level.

8 Claims, 9 Drawing Sheets

METHODOLOGY AND INSTRUMENTATION FOR THIN FILM MECHANICAL ANALYSIS

CROSS-REFERENCE TO RELATED APPLICATION

This application claims priority from U.S. Provisional Patent Application Ser. No. 62/665,219 filed May 1, 2018. The entirety of the provisional application is incorporated herein by reference.

STATEMENT OF GOVERNMENT SUPPORT

This invention was made with government support under grant/contract DE-SC0019361 awarded by the U.S. Department of Energy. The government has certain rights in the invention.

FIELD OF THE INVENTION

The present invention relates generally to obtaining mechanical properties of thin films. Specifically, the invention relates to a system, method, and instrumentation to measure and obtain mechanical properties of thin films down to the nanometer scale. Further, the invention provides a method and instrumentation to probe and obtain the mechanical properties (i.e., modulus and fracture, for example) of ultra thin films down to the nanoscale level.

BACKGROUND OF THE INVENTION

The present invention relates to novel methodologies and instrumentation, via on-fluid, or on-water or on-solvent, or alternatively via no fluid at all, for thin film mechanical analysis to obtain mechanical properties of such materials or thin films. Further, the invention provides a means of recording the properties of the thin films and the parameters of the analysis, as well as a process for transferring the thin film to the tensile tester, wherein the thin film is a nanoscale material.

Mechanical measurement for thin films is technically challenging and practically important. Many areas in modern electronics rely on thin film material having sub-100 nm thickness, such as microelectronic devices, OLEDs, computer micro-chips, and optical coatings, for example.

Mechanical properties of materials measured from the bulk state can deviate from their thin film state due to the influence of the air-polymer interface and polymer-substrate interactions, for example. One previous measurement technique for thin film relies on thin film bulking techniques, such as buckling metrology. In the past decade, this method based on mechanical stability between a bilayer film has been widely adopted by the polymer community to indirectly measure the elastic modulus of buckled polymer films, although it neglects the substrate effect and the strain rate effect. In contrast, the methodology of the present invention is simple to use. The polymer film is first transferred to a pre-stretched (<2% strain) elastic substrate (i.e. poly(dimethylsiloxane) (PDMS)). Upon releasing the stress, the polymeric film buckles to form periodic wrinkles due to energetic competition between film bending and substrate deformation. The periodicity of the buckled film is measured by optical microscopy or atomic force microscopy, for example, then correlated to the elastic modulus of the film and the underlying substrate. Additionally, the yield strain of a supported film can also be measured by laser light diffraction of the film after cyclic straining and relaxing until it plastically deforms. Subsequently, crack onset strain can be obtained by monitoring the formation of cracks while continuously stretching the film on an elastomer with the aid of an optical microscope. Additionally, a stress-strain curve can be drawn by summarizing these three parameters.

The drawback of the existing thin film buckling metrology is obvious: the film is supported by an elastic substrate throughout the test, which makes it an indirect method for quantifying thin film mechanical properties. The substrate effect can greatly influence the sample on its top, and the mechanical results obtained do not necessarily reflect the intrinsic thin film property. For the elastic modulus measurement, one drawback is that the strain rate is not specified during stretching, so even the same polymer can display different apparent elastic modulus. Further, this method requires an elastic modulus mismatch between the substrate and the film, so that it is only useful for relatively stiff polymers that are easy to form buckles, while for a relatively soft polymer, buckles do not necessarily show up or disappear quickly. For yield point measurement, an optical microscope can be used to observe the buckles at certain strain; however, the results will always lag behind the real yielding and are highly dependent on the resolution since small buckles will not be easily seen. The crack onset strain measured is not very reproducible as well, since only a small region of the film can be seen by the optical microscope. Also, the distribution of strain energy by the substrate will postpone the formation of cracks in the film. As most mechanical tests thus far have been performed on supported films, direct measurements of stress-strain response in free standing film is not feasible.

A need exists for new measurement techniques for thin films. The present invention provides such new methodologies and instrumentation to probe the mechanical properties (modulus, fracture, etc.) of ultra thin films.

SUMMARY OF THE INVENTION

The present invention provides a novel system, method, and instrumentation for mechanical analysis of thin films down to the nanoscale level. The invention provides a method to analyze thin film on-liquid, i.e., on water, solvent, etc., or without the use of liquid. The invention is the first type of analysis to measure thin film mechanical properties for film down to about 10 nm and includes thin films and pseudo free-standing thin films. It has distinct and significant advantages over other measurement techniques, such as nanoindentation. In view of the disadvantages inherent in the measurement techniques now present in the prior art, the present invention provides new instrumentation and methodology to probe the mechanical properties (modulus, fracture, for example) of ultra thin films.

The general purpose of the present invention is to provide a new thin film mechanical measurement system for ultra thin film. The new measurement technique has many of the advantages mentioned heretofore and novel features that result in a thin film mechanics (e.g. tensile, fracture behavior) which is not comparable or similar to any existing thin film mechanical testing systems.

The invention generally comprises a high resolution linear stage motor to provide tensile strain to the film, a sensitive load cell to monitor the force exerted on the thin polymer film, versatile linear stage to aid in the attachment and detachment of the film, a liquid or water bath with temperature control to provide the measurement environment for the sample, and a plasma or laser etcher, for example, to pattern polymeric thin films to ASTM standard sample shape.

Further, the invention provides a design of the instrumentation to allow a simple sample transfer and mounting process.

A primary object of the invention is to provide a novel mechanical measurement system for extreme thin film samples that overcomes the shortcomings of existing methods and devices.

Another object of the invention is to provide a measurement tool that can understand the fracture behavior of the thin film.

A further object of the invention is to provide a thin film transfer and handling technique for ultra thin film materials.

Additional objects of the invention are to provide a measurement technique for thin film under different chemical environments, such as conditions in the physiological condition related to biomedical use of the sample, under different temperature conditions, and different thickness conditions.

Yet other objects of the invention are to provide a new measurement technique for the relaxation behavior of thin film, for mechanical hysteresis for thin film under cyclic strain, and for thin film under different strain rates.

With the foregoing and other objects, features, and advantages of the present invention that will become apparent hereinafter, the nature of the invention may be more clearly understood by reference to the following detailed description of the preferred embodiments of the invention and to the appended claims.

BRIEF DESCRIPTION OF THE DRAWINGS

These drawings accompany the detailed description of the invention and are intended to illustrate further the invention and its advantages. The drawings, which are incorporated in and form a portion of the specification, illustrate certain preferred embodiments of the invention and, together with the entire specification, are meant to explain preferred embodiments of the present invention to those skilled in the art. Like reference characters in the drawings designate the same or similar parts throughout the several views. Relevant FIGURES are shown or described in the Detailed Description of the Invention as follows.

DETAILED DESCRIPTION OF THE INVENTION

Figure 1:
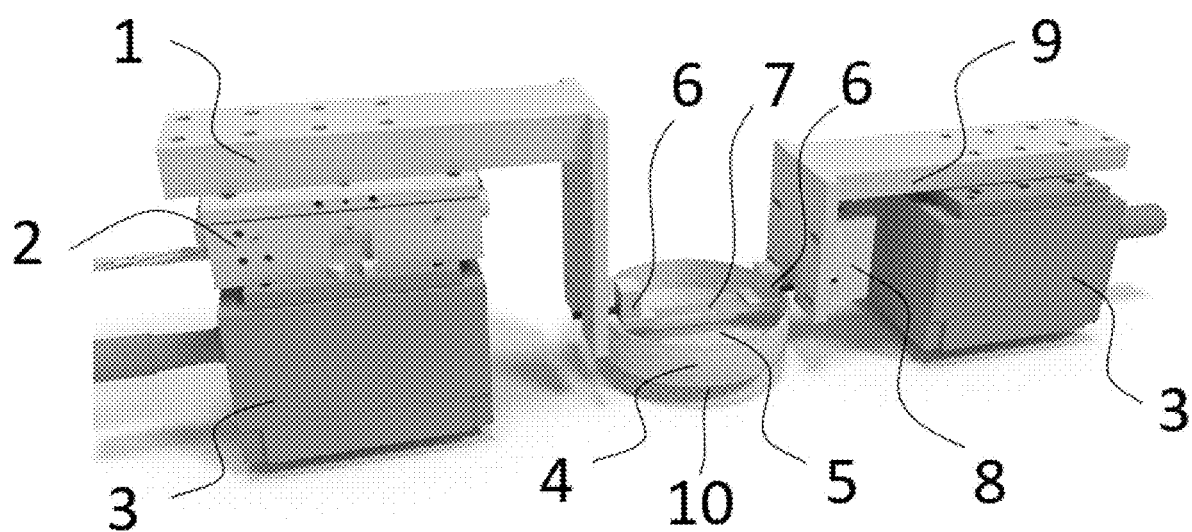
FIG. 1 shows a pictorial schematic illustration of the present invention.

The present invention provides for a novel material characterization system, method, and instrumentation for measuring the mechanical properties of nano-scale thin films. The thin film mechanical characterization system, method, and instrumentation of the present invention for ultra thin films includes a linear stage driven by a motor, such as a linear motor, and a load cell on the opposite side of the thin film material to be tested. The instrumentation device includes a bath that can be filled or used with different forms of liquid, such as water, solvent, and the like, or a combination thereof, to support the film and which can be heated or cooled to control the film temperature. The thin film material can float via the surface tension and can be stretched various lengths, including until permanent deformation occurs, while recording the amount of force applied by the motor and recording other parameters at various analysis stages. Alternatively, the bath may not use a liquid to support the film, such that the thin film to be tested does not float or rest on liquid, but utilizes air instead of liquid. The invention also provides a process that transfers the nano-scale thin film to the tensile tester and a process to obtain the physical mechanical properties of thin films that are at or below a few hundred nanometers. The system and instrumentation can further be controlled via a computer-processor based system and/or computer program(s). In the examples described herein, the silicon wafers utilized are an example of the thin film or ultra thin film material patterned and/or analyzed. Ultra thin film is defined as film down to about 10 nm in thickness.

The invention consists of a method of preparing and/or patterning ultra thin film material, including free-standing or pseudo free-standing thin film, by spin coating layers of thin film from orthogonal solvent to prepare multilayer, typically bilayer, films consisting of at least one sacrificial layer and at least one film layer to be analyzed. The method consists further of utilizing patterning techniques, such as lithography, plasma etching, and/or laser patterning, for example, or a combination thereof, to pattern the thin film into a desired or optimal device geometry(ies) in order to help or aid in the mechanical testing and analysis of the thin film material. The method further includes utilizing the sacrificial layer to prepare the ultra thin film by dissolving the sacrificial layer to release thin film, typically free-standing thin film but not necessarily, down to the nanometer scale.

The invention provides a novel method of measuring the mechanical properties of ultra thin films, free-standing and/or non-free standing, and thin films supported by a liquid, for film thickness down to the nanometer scale, consisting of utilizing a liquid surface to support the thin film during and throughout sample preparation and property measurement to prevent or minimize sample crack due to the thin film material mechanical brittleness. Further, the method provides utilizing at least one soft contact method, such as Van Der Waals force, to mount or place the thin film sample material into the measurement system and instrumentation of the invention for testing. A soft contact method is defined as a method that does not rely on clamp force, but on the weak non-covalent interaction to mount films. Still further, the method includes float transferring of the thin film material and manipulating or positioning the thin film on water, solvent, or appropriate liquid and further mounting the polymeric thin film material to the instrumentation for testing and analysis.

The invention further provides a method of operating a thin film tensile testing system for analyzing film and film parameters comprising at least one electronic controlled and/or motor controlled linear stage, at least one sensitive load cell unit, with sensitivity down to about the nano Newton level, preferably located on the opposite side of the linear stage, so that the thin film is positioned therebetween, and a thin film supporting device, such as a liquid, wherein the method comprises applying controlled strains to the thin film having liquid support though a micromanipulator for ultra thin film materials, sensing and measuring the parameters of the applied force or strains on the film though or via the at least one sensitive load cell unit, and monitoring the deformation mechanism for the thin film through an optical microscope or other relevant technique, for example. Additionally, the method contemplates and comprises processing measured experimental data of stress and strain parameters and results, which typically includes the force and linear movement of the linear stage to relevant engineering stress and strain curve(s), and other analysis parameters of the film, or a combination thereof, via a computer-based processor. The method also provides for the measurement of mechanical properties, such as full stress/strain curve(s), modulus, and toughness, of the ultra thin film material with and without liquid or water support at various thin film thicknesses. Monitoring, measuring, controlling, and recording of the thin film parameters during analysis can be via at least one computer-based processor.

The method of the invention provides measurement of the fracture energy of the ultra thin film material with and without liquid or water support, as well as the strain rate dependent viscoelastic properties or viscoelasticity of the ultra thin film both with and without liquid or water support. Moreover, measurements of hysteresis behavior and fatigues of the ultra thin film material with and without liquid or water support are available using the methodology of the invention.

The present invention includes methodology to measure the mechanical response of ultra thin film materials in various operation temperatures and sample environments. The invention is further capable of being combined with other techniques, such as optical characterization techniques, for observing, monitoring, and recording strain-induced optical property changes in thin film materials. Finally, the invention allows and provides for inducing an aligned polymer chain in the strain direction within the thin film material.

Overview

Figure 2:
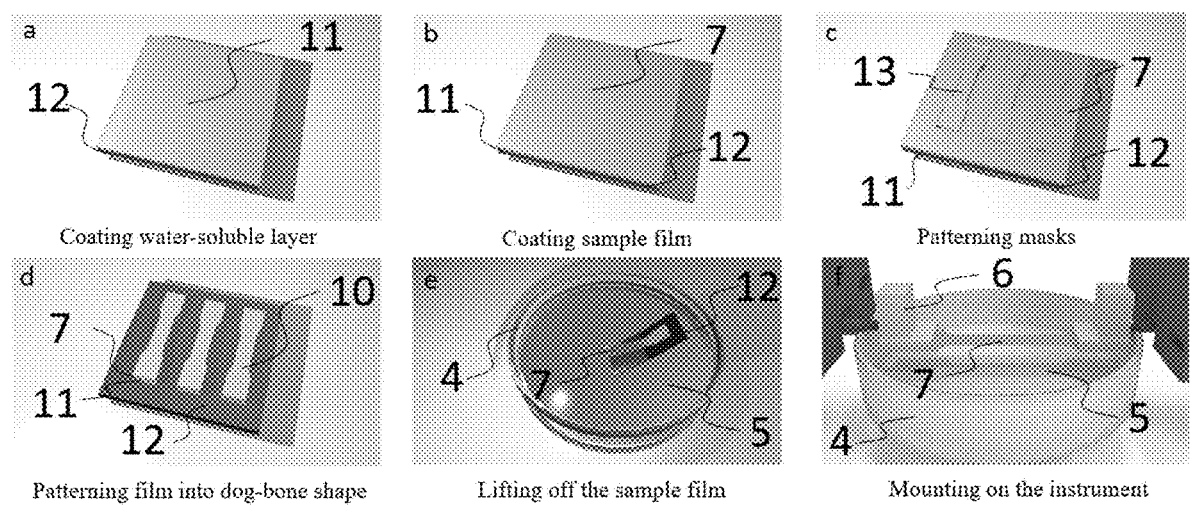
FIG. 2 shows a pictorial illustration of standard testing procedures of the present invention.

FIGS. 1 and 2 illustrate the mechanical testing system, method, and instrumentation or device of the present invention for a thin film 7, which comprises a high resolution electronic control linear stage 2, driven by a motor, such as a linear motor for example (not shown) to move the linear stage 2 and thin film 7, typically but not necessarily in multiple directions, that imposes precise deformation to the thin film 7 through a first L-shaped arm 1, and a load cell unit 8 mounted on a second L-shaped arm 9 opposite the first L-shaped arm 1 that precisely determines the load or forces applied to the thin film 7 located and positioned between first L-shaped arm 1 and second L-shaped arm 9. The invention includes two sample grips 6 on opposite sides of the thin film 7 that hold or secure the thin film in place, wherein one first sample grip 6 is connected to first L-shaped arm 1 and another second sample grip 6 is connected to second L-shaped arm 9 and load cell unit 8, a liquid bath 4 that holds liquid 5 that is water, solvent, or the like, that provides support to the thin film 7, a temperature stage 10 that controls the liquid bath 4 temperature that thin film 7 sits on or floats on, and a first vertical stage 3 that controls the mounting of a PDMS pad to contact and connect one side of the thin film 7 surface to the first L-shaped arm 1 and linear stage 2, and a second vertical stage 3 to contact and connect the other side of the thin film 7 surface to the second L-shaped arm 9 and load cell unit 8. Alternatively, the present invention can be utilized for analyzing thin films supported either by liquid 5, i.e., water or solvent, for example, or free-standing in air with no liquid.

Strain Measurement

Upon mounting the thin film 7 on the tensile test, the motor-driven linear stage 2 can be controlled through a compatible software, where operating parameters, such as the moving direction, speed, and displacement of the linear stage 2 can be input and controlled. The time required for the thin film 7 to deform and/or break is recorded by the load cell unit 8. The strain is calculated using the following equation (1):

$$\text{strain} = \frac{\text{Displacement in the film}}{\text{Film original length}} = \frac{\text{Speed} \times \text{time}}{\text{Film original length}} \qquad (1)$$

Stress Measurement

The load cell unit 8 that is connected to second sample grip 6 can detect the force exerted from the thin film 7 sample over time. The force recorded can also be transferred to stress using the following equation (2):

$$\text{stress} = \frac{\text{Force in the film}}{\text{cross section area of the film}} = \frac{\text{Force recorded on the load cell}}{\text{Film width} \times \text{Film thickness}} \qquad (2)$$

Sample Patterning

The samples were prepared through the following steps. First, a releasing layer 11 (e.g. poly (sodium 4-styrene-sulfonate), poly (acrylic acid), poly (vinyl alcohol), for example) can be casted on top of a flat substrate 12 (e.g. glass sheet, silicon wafer, for example) through different casting or coating methods (e.g. spin casting, for example) (FIG. 2a). Then, the target sample thin film 7 can be casted or coated on the same flat substrate 12 on top of the releasing layer 11 to form a composite film structure (FIG. 2b). The thickness of the thin film 7 can be measured using an interferometer (Filmetrics Inc. UVX) or an atomic force microscope (AFM), for example. Later, dog-bone shaped etching masks 13 were laid on top of the target sample thin film 7 (FIG. 2c), then transferred into an oxygen plasma etcher (Diener Electronics Inc.) to etch away the residual sample (FIG. 2d). Thus, upon peeling off the etching mask, the target sample thin film 7 can be etched into the dog-bone shape. One alternate way to pattern the sample is through a laser cutter using a dog-bone profile.

Sample Mounting

After patterning the target sample material thin film 7 into a dog-bone shape, the bilayer film was slowly dipped into a water liquid bath 4 containing the liquid 5 to dissolve the releasing layer 11 and float the dog-bone sample thin film 7 (FIG. 2e). At least one releasing layer 11 can be utilized and is a sacrificial layer. After the dog-bone shaped multiple thin films 7 were floated, two sample grips 6 coated with a thin adhesive layer (e.g. PDMS) were carefully lowered to contact the ends of the dog-bone shaped sample thin film 7 (FIG. 2*f*) and to mount for analysis by the test instrument.

Operation

The tensile test was performed by applying various strains to the thin film 7 through a motorized linear stage 2 driven by a motor (not shown) and equipped with a digital encoder (not shown), while monitoring the force exerted on the thin film 7 with a high-resolution load cell unit 8. A CCD camera was used to aid the sample alignment, visualization of the stretching process, and performing digital image correction.

Example 1: Tensile Test on the Glassy Polymer (e.g. Polystyrene (PS))

Sample preparation. A PS sample with a molecular weight of 173 kDa was dissolved in toluene to make a solution with a concentration of 10 mg/ml. Poly (sodium 4-styrenesulfonate) (PSS) was dissolve in deionized water to make a 3 mg/ml solution. A PDMS thin sheet was made using a base/curing agent ratio of 10:1 and later attached to the bottom of the aluminum grips.

Figure 3:
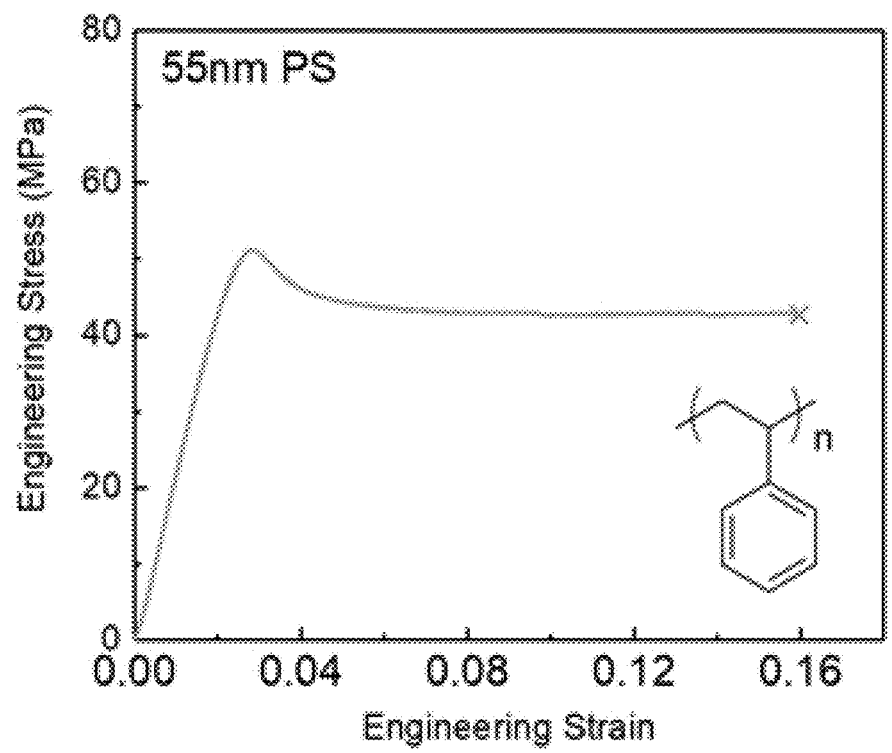
FIG. 3 shows a graphical illustration of the example mechanical data for a thin glassy polymer film (55 nm polystyrene).

Testing procedure. First, PSS was spin coated on top of a silicon wafer at 4000 rmp/s, followed by the spin coating of PS solution at 2000 rpm/s. Upon slowly dipping the substrate in water, PS film floated on the water. Then, the PS film was attached to the PDMS coated grip and aligned linearly. After alignment, the linear stage was controlled to move at a strain rate of $5 \times 10^4$ $s^{-1}$, and load cell unit 8 recorded the force value. A complete stress-strain curve can be converted from force-time data. Shown in FIG. 3 is the full stress-strain curve for 55 nm thin PS film.

Example 2: Tensile Test on the Viscoelastic Polymer (e.g. Poly(3-Hexyl Thiophene) (P3HT))

Sample Preparation.

A P3HT sample with a molecular weight of 26 kDa was dissolved in chlorobenzene to make a solution with a concentration of 10 mg/ml. Poly (sodium 4-styrenesulfonate) (PSS) was dissolved in deionized water to make a 3 mg/ml solution. A PDMS thin sheet was made using a base/curing agent ratio of 10:1 and later attached to the bottom of the aluminum grips.

Testing Procedure.

Figure 4:
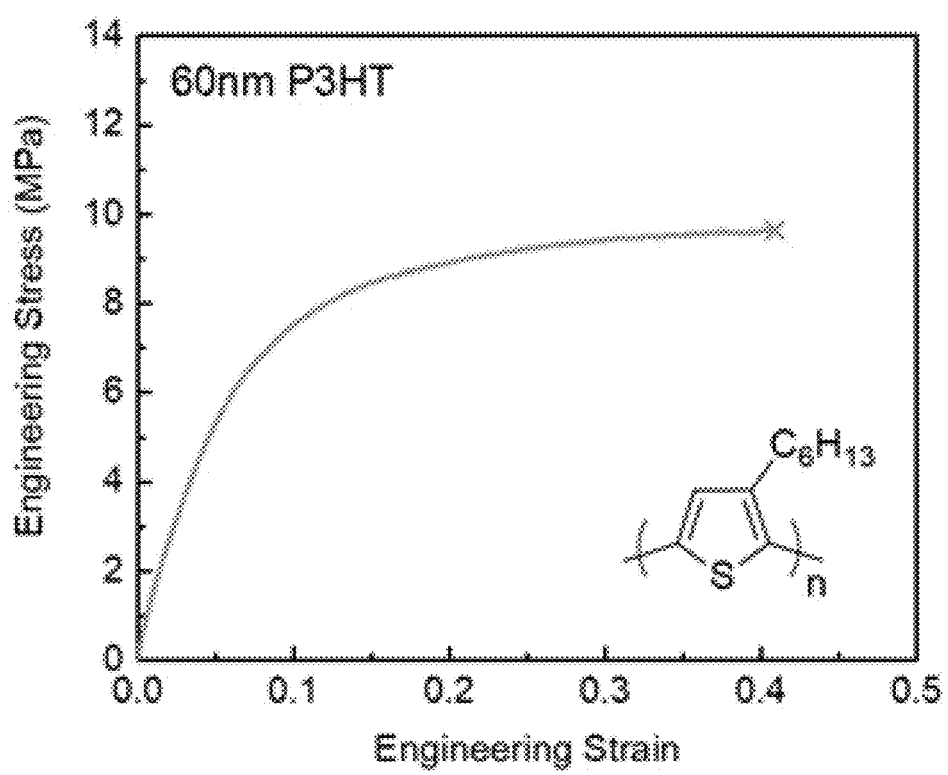
FIG. 4 shows a graphical illustration of the example mechanical data for a thin viscoelastic polymer film (60 nm polythiophene).

First, PSS was spin coated on top of a silicon wafer at 4000 rpm/s, followed by the spin coating of P3HT solution at 2000 rpm/s. Upon slowly dipping the substrate in water, P3HT film floated on the water. Then, the P3HT film was attached to the PDMS coated grip and aligned linearly. After alignment, the linear stage was controlled to move at a strain rate of $5 \times 10^{-4}$ $s^{-1}$, and load cell unit 8 recorded the force value. A complete stress-strain curve can be tested. Shown in FIG. 4 is the full stress-strain curve for 60 nm thin P3HT film.

Example 3: Viscoelastic Property Characterization (e.g. Poly(3-Hexyl Thiophene) (P3HT))

Stress Relaxation Measurement.

Figure 5:
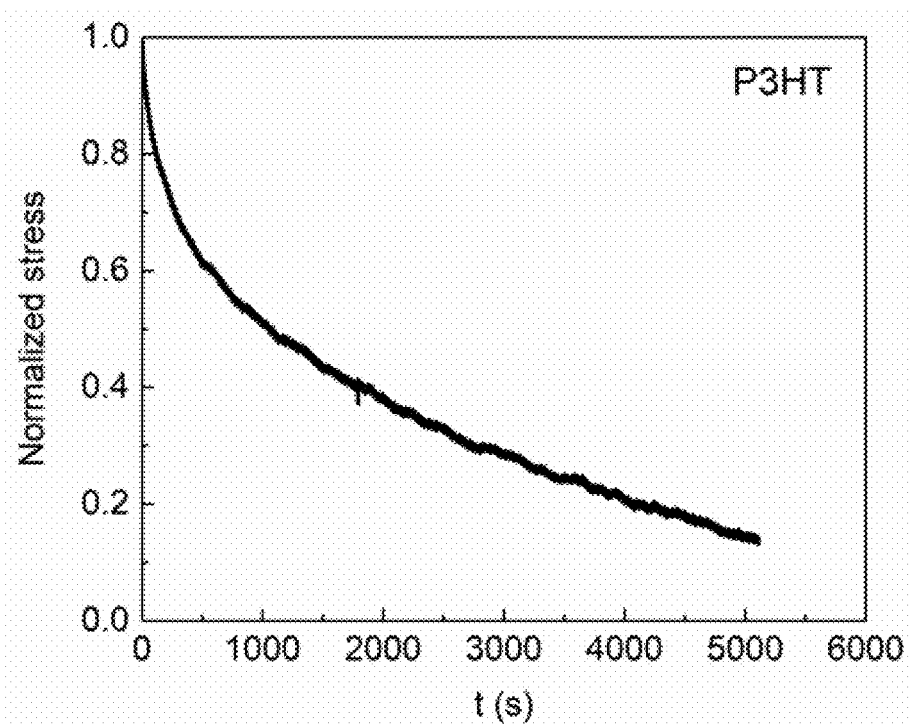
FIG. 5 shows a graphical illustration of the example stress relaxation test for a thin viscoelastic polymer film (60 nm polythiophene).

A P3HT dog-bone sample was floated on water and mounted on the tensile stage as stated in Example 2. Then, the polymer film was stretched to 2% strain at a strain rate of $1 \times 10^{-3}$ $s^{-1}$ and the exerting force on the load cell unit 8 is monitored over time. The stress was recorded as a function of time and plotted as shown in FIG. 5.

Hysteresis Measurement.

Figure 6:
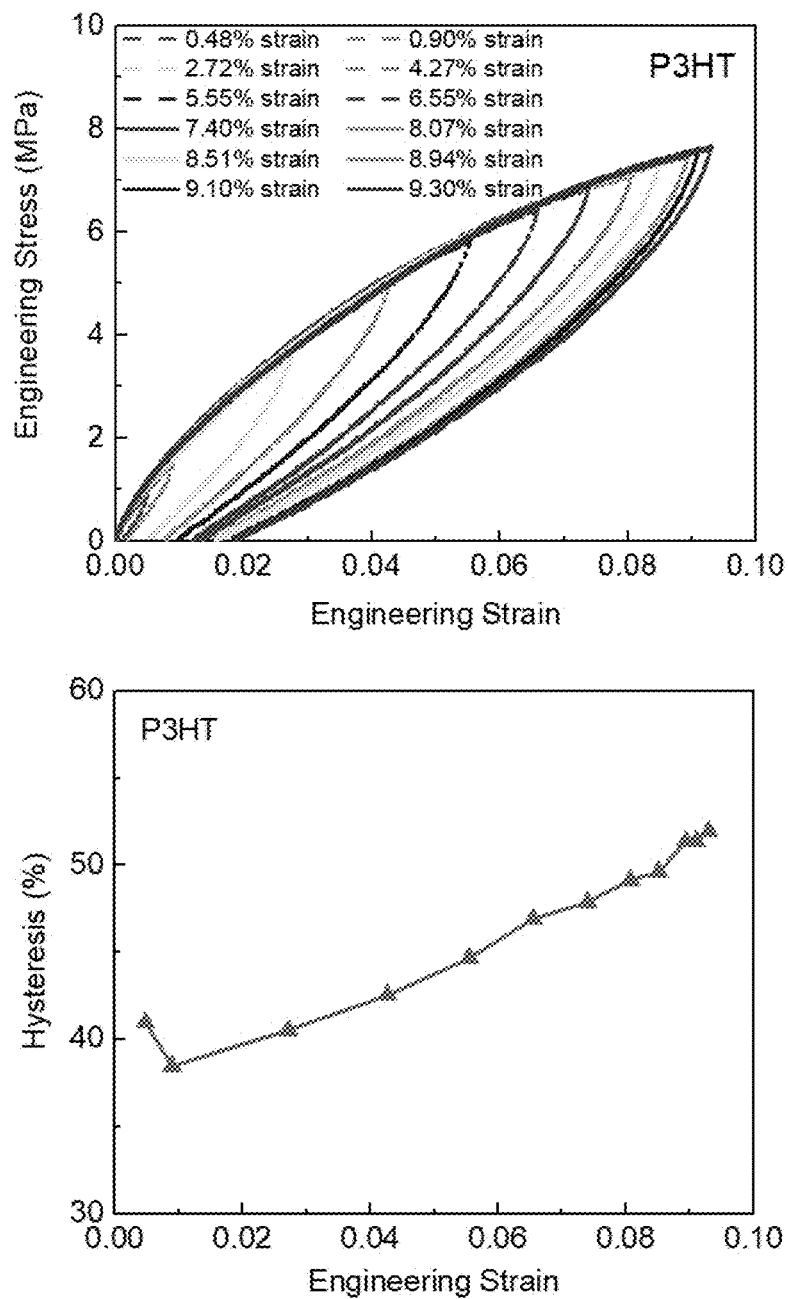
FIG. 6 shows a pictorial representation of the example hysteresis test for a thin viscoelastic thin film (60 nm polythiophene).

A P3HT dog-bone sample was floated on water and mounted on the tensile stage as stated in Example 2. The cyclic loading-unloading-reloading test was performed to understand the hysteresis property. First, the polymer film was stretched to a small strain, then the stress was released at the same strain rate until fully relaxed; afterwards, the film underwent additional load-unload cycle with a slightly larger strain. The stress vs. displacement curve during repeated stretch was plotted as shown in FIG. 6. The hysteresis was calculated by the ratio of the energy lost (the area between the loading and unloading curve) divided by the energy exerted on the film (the area below the loading curve).

Strain-Rate Dependent Measurement.

Figure 7:
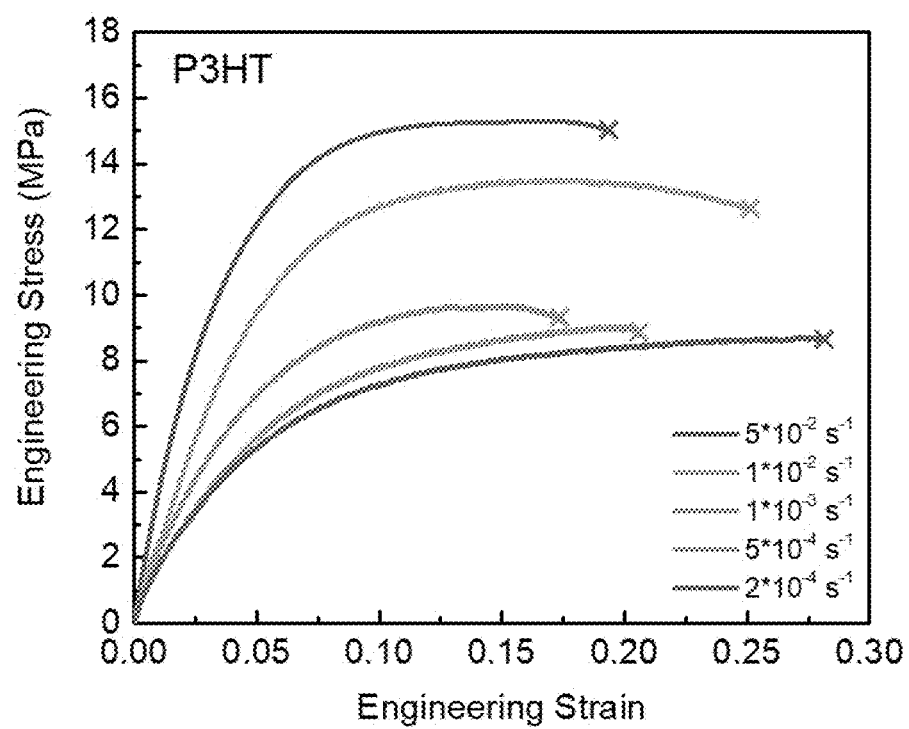
FIG. 7 shows a graphical illustration of the example strain rate-dependent test for a thin viscoelastic thin film (60 nm polythiophene).

A P3HT dog-bone sample was floated on water and mounted on the tensile stage as stated in Example 2. Then, the polymer film was stretched at different strain rates including $2 \times 10^{-4}$ $s^{-1}$, $5 \times 10^{-4}$ $s^{-1}$, $1 \times 10^{-3}$ $s^{-1}$, $1 \times 10^{-2}$ $s^{-1}$, and $5 \times 10^{-2}$ $s^{-1}$, as shown in FIG. 7.

Example 4: Thickness-Dependent Property Characterization (e.g. Poly(3-Hexyl Thiophene) (P3HT))

Testing Procedure 1.

A P3HT sample with a molecular weight of 26 kDa was dissolved in chlorobenzene to make a solution with different concentrations (3 mg/ml, 5 mg/ml, 10 mg/ml, 15 mg/ml and 20 mg/ml). Poly (sodium 4-styrenesulfonate) (PSS) was dissolved in deionized water to make a 3 mg/ml solution. A PDMS thin sheet was made using a base/curing agent ratio of 10:1 and later attached to the bottom of the aluminum grips.

Testing Procedure 2.

Figure 8:
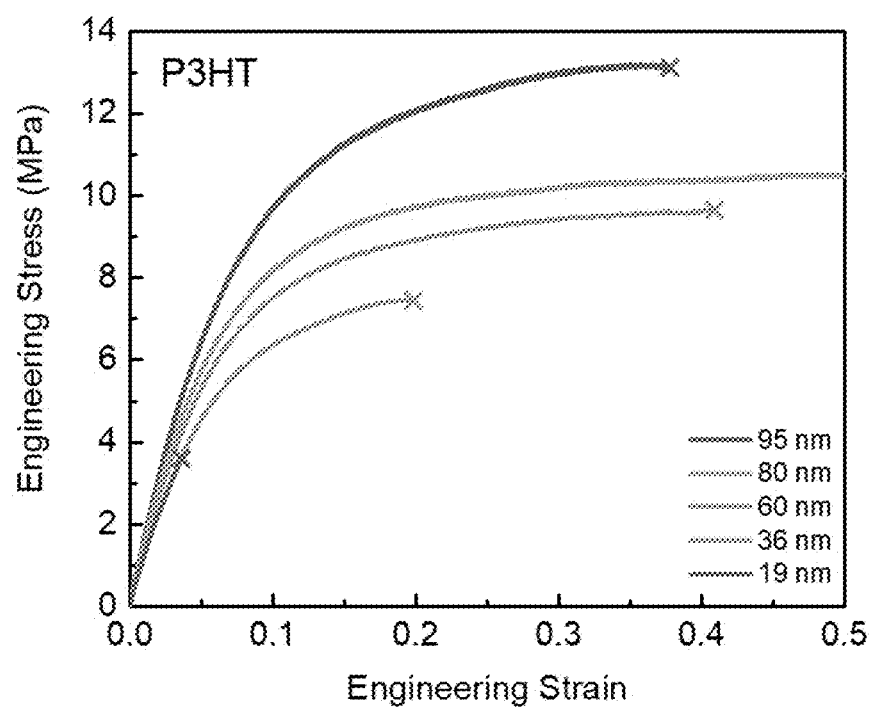
FIG. 8 shows a graphical representation of the example thickness-dependent test for a thin viscoelastic thin film (60 nm polythiophene).

First, a PSS was spin coated on top of a silicon wafer at 4000 rpm/s, followed by the spin coating of P3HT solution at 2000 rpm/s. Due to the different concentrations of P3HT solution, the resulting film thickness will be and was different, ranging from 19 nm to 95 nm. Upon slowly dipping the substrate in water, P3HT film floated on water. Then, the P3HT film was attached to the PDMS coated grip and aligned linearly. After alignment, the linear stage was controlled to move at the rate of 5 um/s, and load cell unit 8 recorded the force value. A complete stress-strain curve can be tested. Shown in FIG. 8 is the full stress-strain curve for P3HT films with different thicknesses.

Example 5: Fracture Energy of the Ultra-Thin Films (60 nm PS and 80 nm P3HT)

Testing Procedure.

Figure 9:
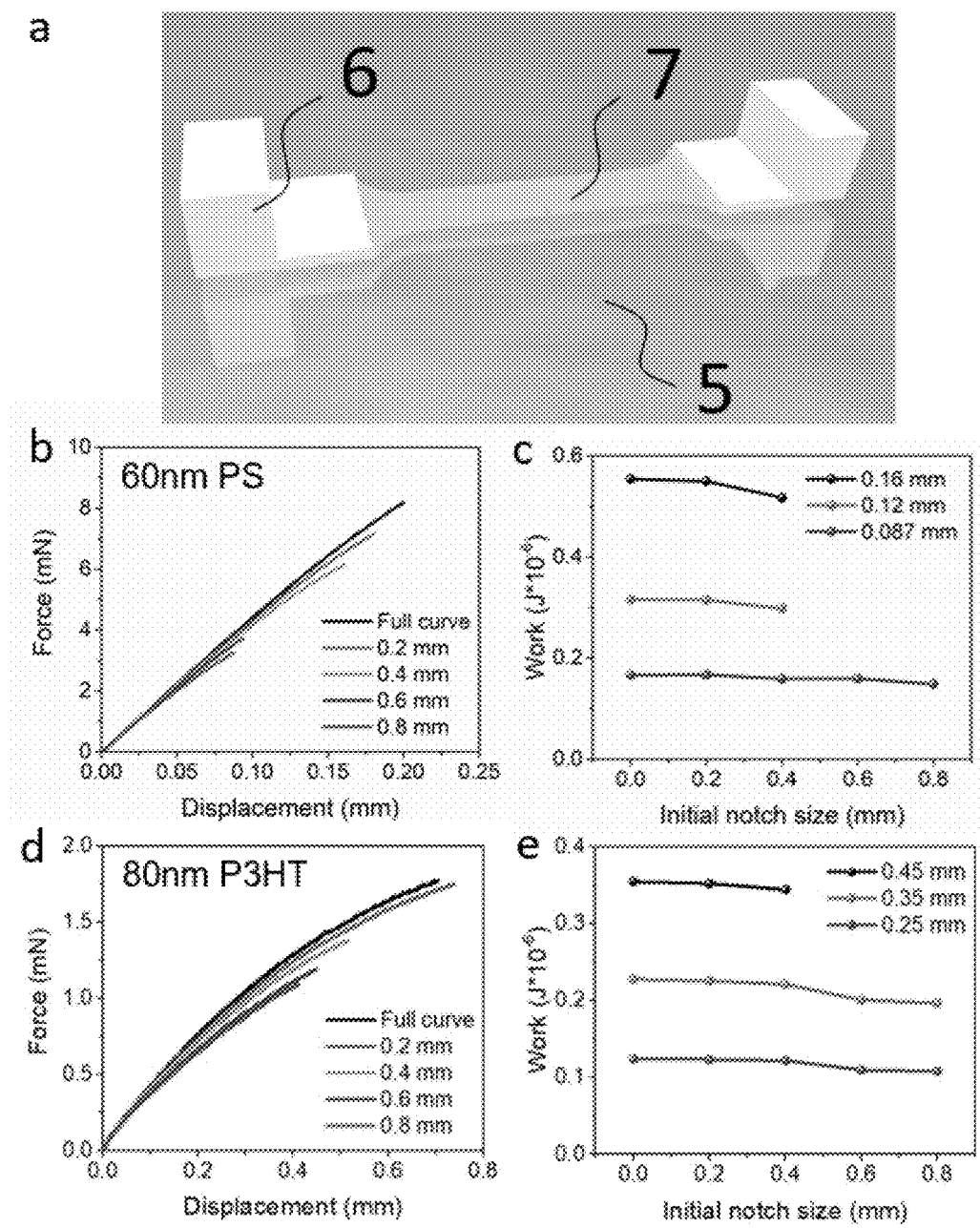
FIG. 9 shows a pictorial and graphical illustration of the example of the fracture energy test for 60 nm polystyrene and 80 nm polythiophene thin films.

In the sample patterning process, after the dog-bone thin film 7 was patterned, an extra notch with a certain size was etched on the thin film 7 edge at the half-length position, which is perpendicular to the thin film 7 edge (FIG. 9*a*). The notch size was varied from about 0.2 mm to about 0.8 mm length, or about 10% to 40% of the original film width, with a spacing of 10%. Later, the thin films 7 were floated on top of the liquid 5 and mounted on the first and second sample grip 6. Upon stretching at a strain rate of $5 \times 10^4$ $s^{-1}$, a force versus time curve can be recorded by the load cell unit 8. The displacement in the thin film 7 can be obtained using the following equation (3):

$$\text{Displacement in the film} = \text{Speed} \times \text{time} \qquad (3)$$

A CCD camera was used to record the stretching process in order to observe the notch propagation.

Data Processing.

The force versus displacement curves for 60 nm PS and 80 nm P3HT thin films were plotted separately in FIG. 9b and FIG. 9d. The endpoint of these curves represents the starting point of the notch propagation process. Then, three different displacement values were selected and the area underneath the force-displacement curve (representing for the amount of work to propagate the notch) was integrated at each displacement. The displacement values selected are close to the endpoint of different curves. Later, the areas for different notch sizes of the thin film 7 at each displacement were plotted versus the initial notch size, and the highest slope was chosen to calculate the fracture energy (FIG. 9c and FIG. 9e). The equation (4) is shown below:

$$\text{Fracture energy} = \frac{\text{Slope}}{\text{Film thickness}} = \frac{1}{\text{Film thickness}} \times \frac{\Delta \text{Work}}{\Delta \text{Initial notch size}} \quad (4)$$

In this equation, $\Delta$ represents the distance between two numbers. Work represents the area integrated from the force-displacement curves at certain displacement. In this case, the fracture energy of PS was calculated to be 1506 $J/m^2$ and the fracture energy of P3HT ranged from 320~542 $J/m^2$.

The invention provides, as described herein, a system, method, and instrumentation for providing an efficient and cost-effective process for measuring and obtaining physical mechanical properties of and from thin film materials down to the nanoscale size. Current methods and/or devices used for such purposes do not allow such measurements and analysis to be done on such materials. However, the invention provides the ability to obtain more accurate mechanical properties of and from these materials using much less material.

The present invention allows the accurate and efficient measurement of strengths of extremely small materials, thin films, free-standing thin films, and/or pseudo free-standing thin films as various loads are applied to the particular material. The behavior of such materials can then be easily observed and the actions applied to the thin film and the film resultant parameters can be recorded and/or controlled via a computer-based processor. The methodology further provides a process to transfer the thin film sample to the tensile testing instrument.

All parameters presented herein including, but not limited to, sizes, dimensions, times, temperatures, pressures, amounts, quantities, ratios, weights, volumes, and/or percentages, and the like, for example, represent approximate values. Recitations of numerical values and/or numerical ranges can be read to include the term 'about'. Further, references to 'a' or 'an' concerning any particular item, component, material, or product is defined as at least one and could be more than one. The terms 'comprises' and 'includes' and variations thereof are not to have a limiting meaning.

The above detailed description is presented to enable any person skilled in the art to make and use the invention. Specific details have been revealed to provide a comprehensive understanding of the present invention and are used for explanation of the information provided. These specific details, however, are not required to practice the invention, as is apparent to one skilled in the art. Descriptions of specific applications, analyses, materials, components, dimensions, and calculations are meant to serve only as representative examples. Various modifications to the preferred embodiments may be readily apparent to one skilled in the art, and the general principles defined herein may be applicable to other embodiments and applications while still remaining within the scope of the invention. There is no intention for the present invention to be limited to the embodiments shown and the invention is to be accorded the widest possible scope consistent with the principles and features disclosed herein.

While various embodiments of the present invention have been described above and in the attached documents, it should be understood that they have been presented by way of example and not limitation. It will be apparent to persons skilled in the relevant art(s) that various changes in form and detail can be made therein without departing from the spirit and scope of the present invention. In fact, after reading the above description, it will be apparent to one skilled in the relevant art(s) how to implement the invention in alternative embodiments. All embodiments herein can be made without undue experimentation in light of the disclosure. The Applicants have described the preferred embodiments of the invention, but it should be understood that the broadest scope of the invention includes such modifications as additional or different methods and materials. Many other advantages of the invention will be apparent to those skilled in the art from the above descriptions, reference documents, and the subsequent claims. Thus, the present invention should not be limited by any of the above-described exemplary embodiments.

The processes, apparatus, instrumentation, systems, methods, products, and compositions of the present invention are often best practiced by empirically determining the appropriate values of the operating parameters, or by conducting simulations to arrive at best design for a given application. Accordingly, all suitable modifications, combinations, and equivalents should be considered as falling within the spirit and scope of the invention.

What is claimed is:

1. A thin film tensile instrument for analyzing thin film mechanical properties, the instrument comprising:
   an electronic control linear stage for controlling the force applied to a thin film;
   a load cell unit for determining the force applied to the thin film;
   at least two sample grips for securing the thin film, each of the at least two sample grips including a thin adhesive layer configured to adhere to the thin film, wherein the grips are positioned on opposite sides of the thin film;
   a first and a second L-shaped arm for mounting the thin film to be analyzed;
   a first vertical stage for mounting the first L-shaped arm and the linear stage and a second vertical stage for mounting the second L-shaped arm and the load cell unit;
   a fluid support for the thin film, wherein the support includes a liquid bath holding a liquid and the first and second L-shaped arms are configured to position the thin film on a surface of the liquid held by the liquid bath;
   a temperature stage to control a temperature of the liquid of the liquid bath; and
   a motor to move the linear stage and the thin film.

2. The instrument of claim 1, wherein the linear stage, load cell unit, and motor are controlled by a computer-based processor.

3. The instrument of claim 1, wherein the thin adhesive layer is a poly (dimethylsiloxane) (PDMS) layer.

4. The instrument of claim 1, wherein the thin film is formed of poly (sodium 4-styrenesulfonate) (PSS).

5. The instrument of claim 1, wherein a thickness of the thin film is configured to be measured in tens of nanometers.

6. A thin film tensile instrument for analyzing thin film mechanical properties, the instrument comprising:
   an electronic control linear stage for controlling the force applied to a thin film;
   a load cell unit for determining the force applied to the thin film;
   at least two sample grips for securing the thin film, each of the at least two sample grips including a thin adhesive layer configured to adhere to the thin film, wherein the grips are positioned on opposite sides of the thin film;
   a first and a second L-shaped arm for mounting the thin film to be analyzed;
   a first vertical stage for mounting the first L-shaped arm and the linear stage and a second vertical stage for mounting the second L-shaped arm and the load cell unit;
   a fluid support for the thin film, wherein the fluid support includes a liquid bath holding a liquid and the first and second L-shaped arms are configured to position the thin film on a surface of the liquid held by the liquid bath; and
   a motor to move the linear stage and the thin film.

7. The instrument of claim 6, wherein the thin adhesive layer is a poly (dimethylsiloxane) (PDMS) layer.

8. The instrument of claim 6, wherein a thickness of the thin film is configured to be measured in tens of nanometers.

* * * * *